(12) United States Patent
Krieg et al.

(10) Patent No.: US 12,743,143 B2
(45) Date of Patent: Sep. 22, 2026

(54) CONSUMING DEVICE AND METHOD FOR AUTHENTICATING A CONSUMABLE COMPONENT

(71) Applicant: Infineon Technologies AG, Neubiberg (DE)

(72) Inventors: Armin Krieg, Graz (AT); Christoph Saas, Munich (DE); Matthias Pichler, Wildon (AT)

(73) Assignee: Infineon Technologies AG, Neubiberg (DE)

( * ) Notice: Subject to any disclaimer, the term of this patent is extended or adjusted under 35 U.S.C. 154(b) by 121 days.

(21) Appl. No.: 18/937,565

(22) Filed: Nov. 5, 2024

(65) Prior Publication Data

US 2025/0147565 A1 May 8, 2025

(30) Foreign Application Priority Data

Nov. 7, 2023 (DE) ..................... 10 2023 130 799.1

(51) Int. Cl.
*G06F 1/28* (2006.01)
*G06F 21/44* (2013.01)
*G06F 21/75* (2013.01)

(52) U.S. Cl.
CPC ................ *G06F 1/28* (2013.01); *G06F 21/75* (2013.01)

(58) Field of Classification Search
CPC ............. G06F 1/28; G06F 21/75; G06F 21/44
See application file for complete search history.

(56) References Cited

U.S. PATENT DOCUMENTS

| | | | | |
|---|---|---|---|---|
| 8,332,945 | B2 | 12/2012 | Kim et al. | |
| 9,401,802 | B2 * | 7/2016 | Card | H04L 9/003 |
| 11,685,580 | B2 | 6/2023 | Narayanan et al. | |
| 2012/0038342 | A1 * | 2/2012 | Warren | H02M 1/00 323/293 |
| 2015/0331463 | A1 * | 11/2015 | Obie | G06F 21/44 713/300 |

(Continued)

FOREIGN PATENT DOCUMENTS

| | | |
|---|---|---|
| DE | 102020105357 A1 | 9/2021 |
| DE | 112020003130 T5 | 6/2022 |

OTHER PUBLICATIONS

Hocherl & Hoackl, "Adjustable internal resistance," web.archive.org/web/20230929042938/https://www.hoecherl-hackl.de/produkte/funktionen/einstellbarer-innenwiderstand/.

(Continued)

*Primary Examiner* — Jaweed A Abbaszadeh
*Assistant Examiner* — Gayathri Sampath
(74) *Attorney, Agent, or Firm* — Eschweiler & Potashnik, LLC

(57) ABSTRACT

In accordance with one embodiment, a consuming device is provided, comprising a power supply for an authentication chip of a consumable component, wherein the internal resistance of the power supply is variable, a detection device configured to capture information about an operating state of the authentication chip for a plurality of values of the internal resistance of the power supply and to determine a dependence of the operating state of the authentication chip on the internal resistance of the power supply, and an authentication circuit configured to authorize the use of the consumable component by the consuming device based on the determined dependence.

20 Claims, 7 Drawing Sheets

(56) References Cited

U.S. PATENT DOCUMENTS

2019/0356497 A1* 11/2019 Ji ............................ H04L 12/10
2021/0271971 A1 9/2021 Guthart et al.

OTHER PUBLICATIONS

Wikipedia, "Voltage Source".
Mexle-Wiki, Electrical Engineering_1: Linear sources and two-terminal devices.
Physics, How does power consumption vary with the processor frequency in a typical computer? [closed]. Published Apr. 22, 2017.

* cited by examiner 600
601
602
603
604
605
606
Power supply
R
Detection device
Authentication circuit
Authentication chip
Consumable component

Figure 7:
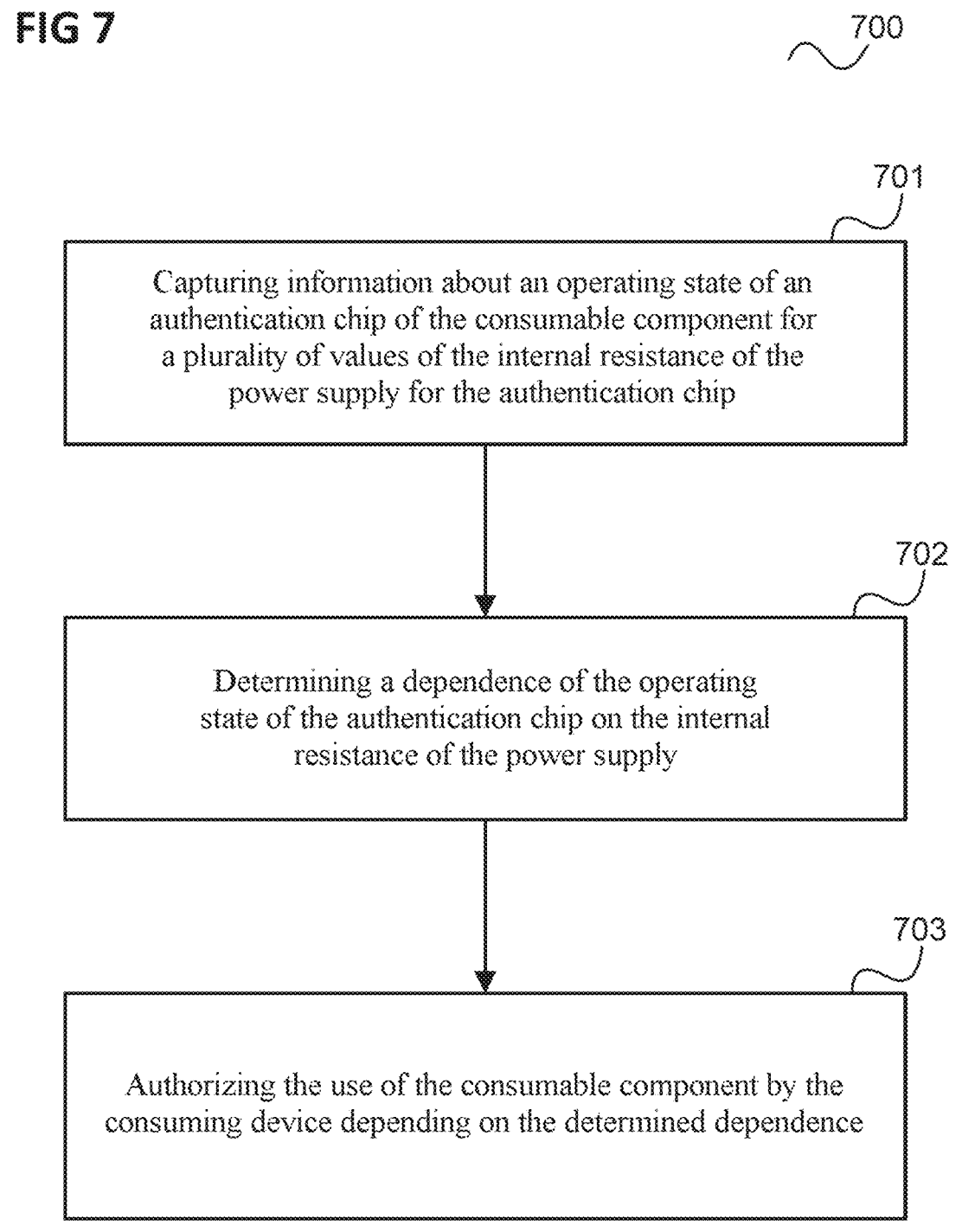

Capturing information about an operating state of an authentication chip of the consumable component for a plurality of values of the internal resistance of the power supply for the authentication chip

702

Determining a dependence of the operating state of the authentication chip on the internal resistance of the power supply

703

Authorizing the use of the consumable component by the consuming device depending on the determined dependence

CONSUMING DEVICE AND METHOD FOR AUTHENTICATING A CONSUMABLE COMPONENT

REFERENCE TO RELATED APPLICATIONS

This application claims priority to German Patent Application 102023130799.1, filed on Nov. 7, 2023, the contents of which are hereby incorporated by reference in their entirety.

TECHNICAL FIELD

Exemplary embodiments generally relate to consuming devices and methods for authenticating a consumable component.

BACKGROUND

Copies are an important topic in end consumer markets with consumables. There is a high risk that copying businesses will make clones of consumable components, which behave just like the original components. The production of clones of consumable components causes a considerable loss of turnover for the manufacturers of the original consumable components, typically more than 20%. Examples of markets in which huge damage is caused by copiers are consumable materials and substitute products such as printer cartridges, camera batteries, e-cigarettes, etc.

SUMMARY

Authentication chips are typically used to protect consumable components. In general, their task is to establish that a consumable component (e.g. a printer cartridge) can be used as an original for the host apparatus (e.g. the printer). In this example, the printer would not accept the cartridge and use it for printing until after the printer cartridge has been authenticated, or in the converse case would for example warn the user that the cartridge is a non-original cartridge. It may moreover be the case that the printer manufacturer does not undertake a full guarantee if non-original parts are used.

However, a copier may also copy (clone) such an authentication chip. Accordingly, technical measures are desirable in order to prevent the use of copied consumables with copied authentication chips in original consuming apparatuses, or at least to make the copy so costly that it is unprofitable.

In accordance with one embodiment, a consuming device is provided, comprising a power supply for an authentication chip of a consumable component, wherein the internal resistance of the power supply is variable, a detection device configured to capture information about an operating state of the authentication chip for a plurality of values of the internal resistance of the power supply and to determine a dependence of the operating state of the authentication chip on the internal resistance of the power supply, and an authentication circuit configured to authorize the use of the consumable component by the consuming device on the basis of the determined dependence.

In accordance with a further embodiment, there is provided a method for authenticating a consumable component at a consuming device in accordance with the consuming device described above.

BRIEF DESCRIPTION OF THE DRAWINGS

The figures do not reproduce the actual size relationships, but rather are intended to serve to illustrate the principles of the various exemplary embodiments. Various exemplary embodiments are described below with reference to the following figures.

FIG. 7 shows a flowchart that illustrates a method for authenticating a consumable component at a consuming device.

DETAILED DESCRIPTION

The following detailed description refers to the accompanying figures, which show details and exemplary embodiments. These exemplary embodiments are described in such detail that a person skilled in the art can carry out the invention. Other embodiments are also possible and the exemplary embodiments can be changed in structural, logical and electrical terms without departing from the subject matter of the invention. The various exemplary embodiments are not necessarily mutually exclusive; rather, various embodiments can be combined with one another to produce new embodiments. In the context of this description, the terms "connected", "attached" and "coupled" are used to describe both a direct and an indirect connection, a direct or indirect attachment and a direct or indirect coupling.

There are several strategies for preventing a professional copier from producing counterfeit (copied) products (such as consumable components). One strategy is to connect/embed an authentication chip (e.g. an authentication ASIC) to/into the replacement medium (e.g. the consumable component such as e.g. a printer cartridge) and to carry out one-way authentication or mutual authentication from the host side (e.g. from the side of the consuming apparatus, such as e.g. a printer). This is described below with reference to FIG. 1 and FIG. 2.

Figure 1:
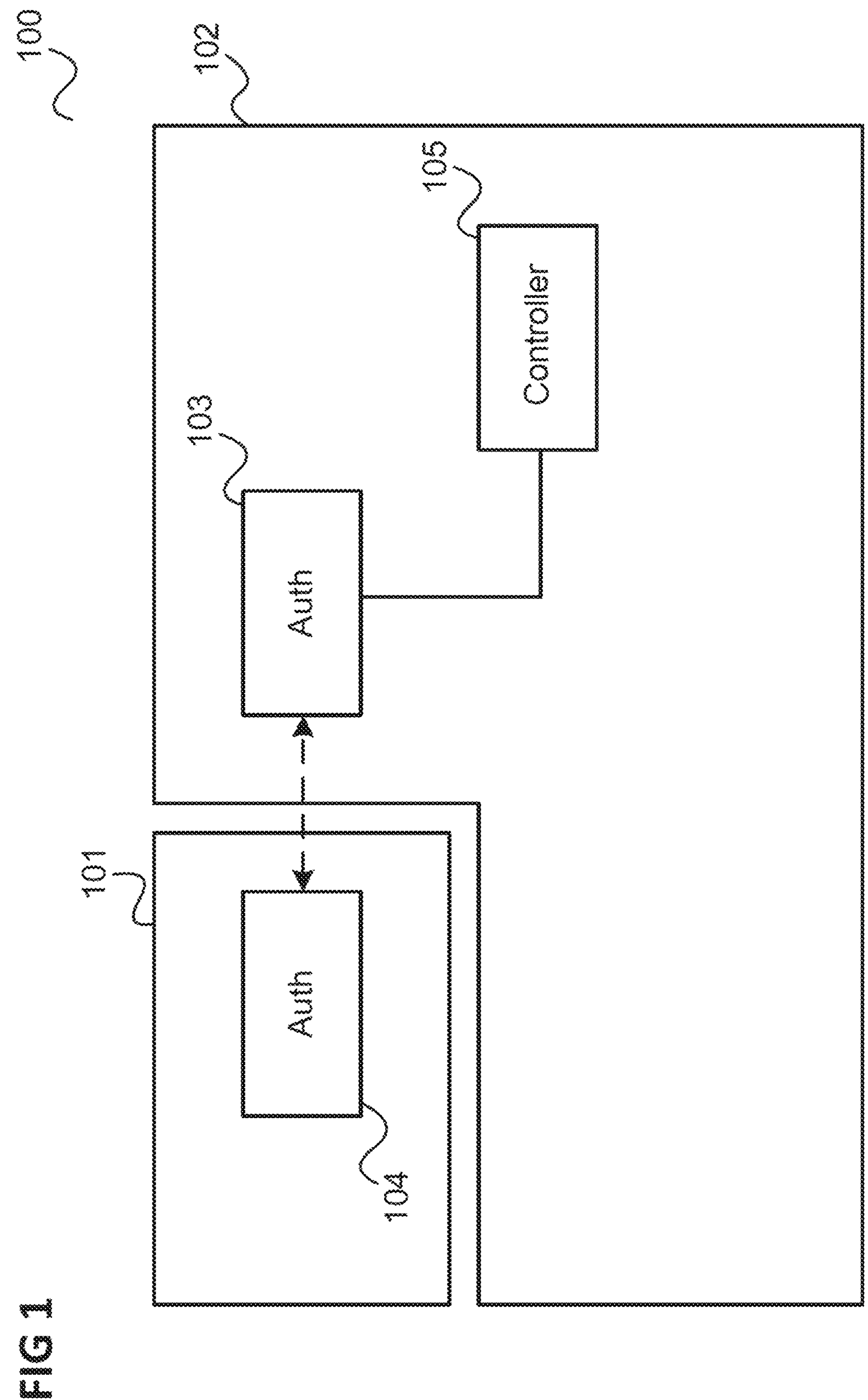
FIG. 1 shows a consumable arrangement.

FIG. 1 shows a consumable arrangement 100, consisting of a consumable 101 (also referred to as consumable component unit) and a consuming (or using) apparatus 102 (also referred to as consuming device).

The consumable 101 is a unit which provides (and for example stores) a resource that is consumed during operation of the consuming apparatus 102.

For example, the consumable contains a (physical) material which is consumed, as in the case of the printer cartridge, a vaporizer cartridge for insecticides or insect repellents, an e-cigarette refill cartridge or a medicinal substance (e.g. medicament) for a medical apparatus in a corresponding container.

Examples of pairs of consumable 101 and consuming apparatus 102 are:

printer cartridge—printer;

refill cartridge—inhaler; and refill cartridge—insect repellent container.

However, the consuming apparatus 102 may also be a vehicle or a camera (the consumable component is then a battery, for example).

The consumable 101 is for example physically connected to the consuming apparatus 102, e.g. inserted or installed. The consumable 101 is typically connected replaceably (in particular releasably) to the consuming apparatus 102.

The manufacturer of a consuming apparatus 102 typically wishes that only consumables 101 produced by them (or a licensee) can be used with the consuming apparatus 102.

Therefore, provision may be made for the consuming apparatus 102 to comprise a host authentication circuit 103, vis-à-vis which a consumable authentication chip 104 must authenticate itself. The consuming apparatus 102 comprises a control device 105, for example, which permits (authorizes) operation of the consuming apparatus 102 (also referred to as host) with the consumable 101 only if the consumable 101 has successfully authenticated itself at the host authentication circuit 103 of the consuming apparatus 102 by means of a consumable authentication chip 104.

Figure 2:
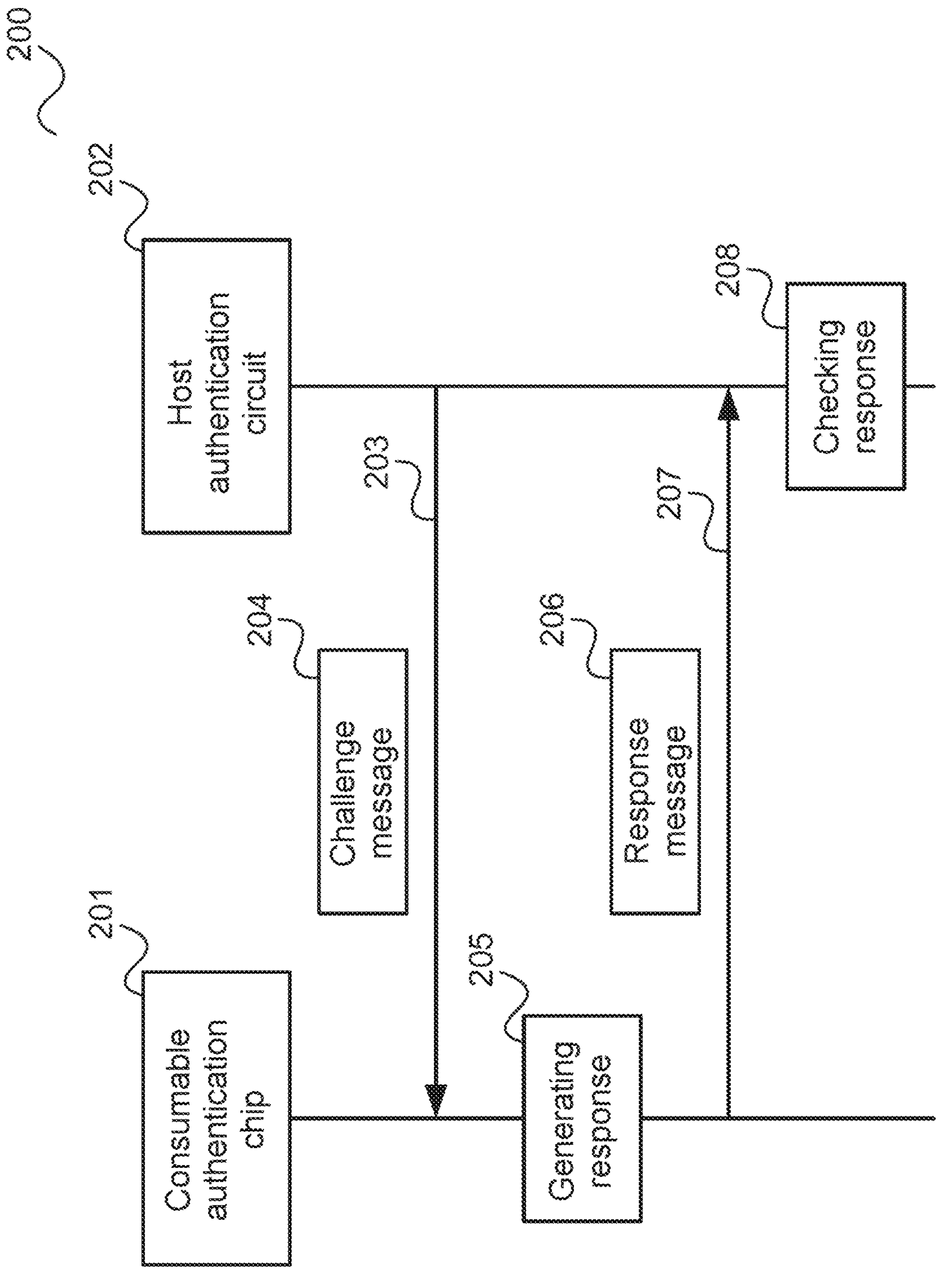
FIG. 2 shows a flowchart for authenticating a consumable authentication chip at a host authentication circuit.

FIG. 2 shows a flowchart 200 for authenticating a consumable authentication chip 201 at a host authentication circuit 202.

The consumable authentication chip 201 and the host authentication circuit 202 respectively correspond for example to the consumable authentication chip 104 and the host authentication circuit 103 in FIG. 1.

In order to authenticate the consumable authentication chip 201 at the host authentication circuit 202, in 203 the host authentication circuit 202 transmits a challenge message 204 to the consumable authentication chip 201. In 205 the consumable authentication chip 201 generates a response, which it communicates in the form of a response message 206 in 207 to the host authentication circuit 202. In 208 the host authentication circuit 202 verifies that the response is correct, for example corresponds to the challenge, and authenticates the consumable authentication chip 201 if that is the case.

For example, the host authentication circuit 202 inserts into the challenge message 204 a random number, on the basis of which the consumable authentication chip 201 must generate the response correctly in order to be authenticated by the host authentication circuit 202. For example, the authentication is based on elliptic curve cryptography (ECC). The response may for example also depend on a cryptographic key negotiated between the consumable authentication chip 201 and the host authentication circuit 202.

In an ideal case, an authentication chip 104 on a consumable 101 can thus ensure that a consuming apparatus 102 uses only original consumable component units.

However, there is the risk that a manufacturer of a nonoriginal consumable (that is to say the copier) will provide the nonoriginal consumable with a nonoriginal authentication chip (e.g. a clone of the authentication circuit).

In order to make this difficult for the copier, the authentication chip may be produced using specific anticloning technologies, for which reverse engineering can be carried out only with difficulty. The main difficulty for the copier in producing a clone is this reverse engineering step. However, as soon as the copier has succeeded in carrying out reverse engineering and e.g. extracting secret keys from the authentication chip, the copier can produce a functional clone with a standard chip design flow. The copier can even produce the clone with a view to cost optimizations, possibly using other technologies, other design libraries, etc.

A description is given below of exemplary embodiments which provide a second line of defense for the manufacturer and make it possible for a consuming apparatus to be able to differentiate a copied consumable component with a functional clone of an authentication chip from an original consumable component with an original authentication chip.

It is assumed here that the clone fulfills the original function specification, so that the consuming apparatus cannot differentiate the clone of the authentication chip by means of cryptographic protocols or function tests.

In accordance with various embodiments, a characteristic of the authentication chip 104 which is measurable for the authentication device 103 (e.g. the host) is used by the authentication device 103 during interaction with the authentication chip 104 in order to ensure that the authentication chip 104 is not a counterfeit.

Specifically, in accordance with various embodiments, the authentication device 103 checks the specific behavior (e.g. the operating state) of the authentication chip 104 with a low supply voltage caused on account of a high-resistance voltage supply by the authentication device 103, wherein the authentication device 103 can vary the internal resistance of the voltage supply with which it supplies the authentication chip 104, in order to check the operating state of the authentication chip 104 for various supply voltages. The behavior (e.g. the operating state) of the authentication chip 104 which depends on the supply voltage is for example the type of internal clock generation (specifically the clock frequency), but the authentication chip 104 can also be configured to adjust other parameters of its processing depending on the supply voltage (e.g. the cryptography method used, e.g. DES (Data Encryption Standard) instead of AES (Advanced Encryption Standard) etc.), which can be observed by the authentication device 103.

Since the resulting supply of the authentication chip 104 (both the voltage drop with respect to the current source of the authentication device 103 and the current consumption of the authentication chip 104) is determined by the internal power management of the authentication chip 104, this supply is unique to the authentication chip 104 and can be reproduced in a clone only with difficulty. If the authentication device 103 therefore checks a parameter of the processing of the authentication chip 104 which the latter adjusts depending on its supply, good protection against clones can therefore be achieved.

Figure 3:
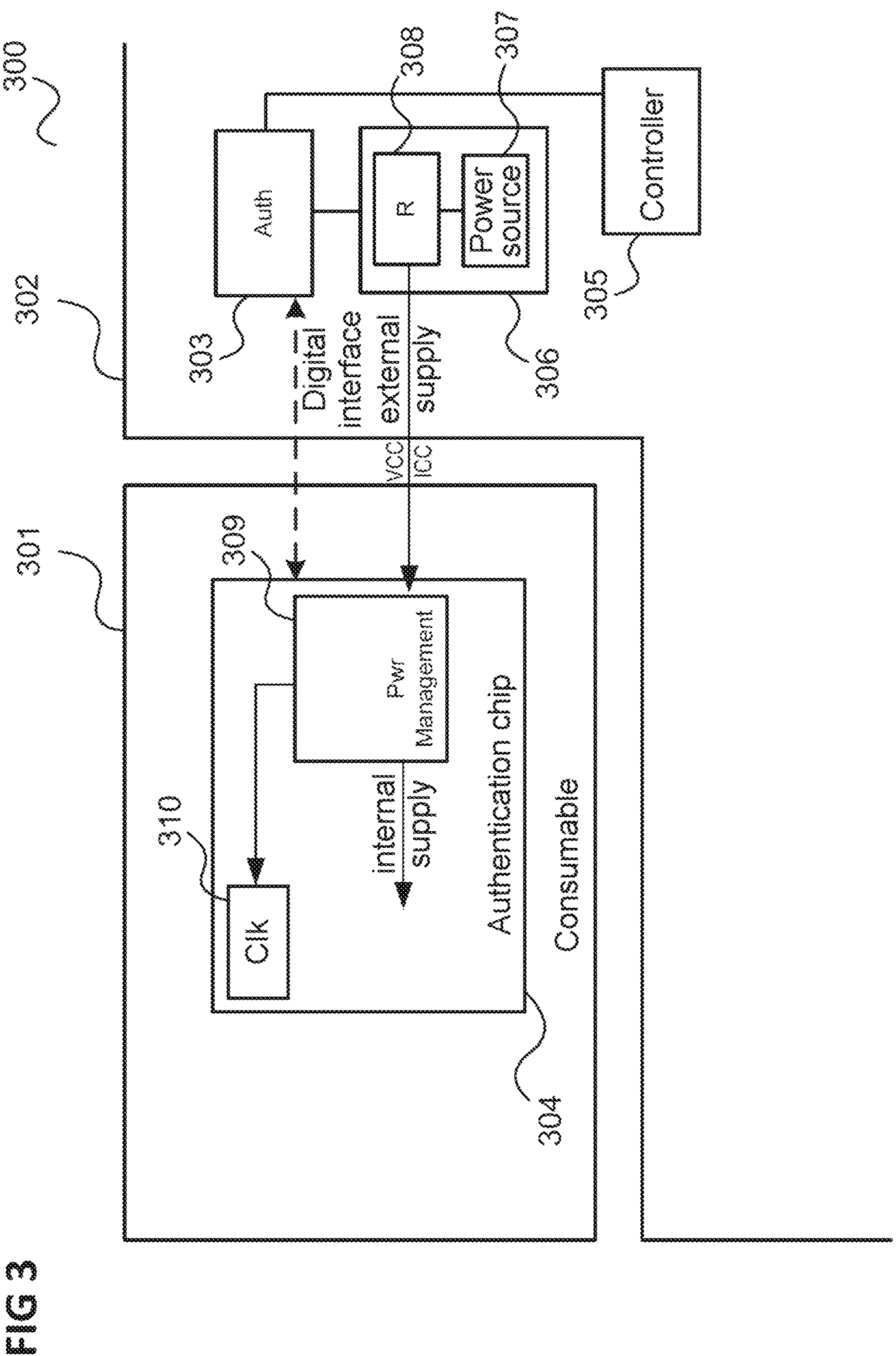
FIG. 3 shows a consumable arrangement in accordance with one embodiment.

FIG. 3 shows a consumable arrangement 300 in accordance with one embodiment.

As described with reference to FIG. 1, the consuming apparatus (consuming device) 302 comprises a host authentication circuit 303, vis-à-vis which the authentication chip 304 must authenticate itself. The consuming apparatus 302 comprises a control device 305, which permits operation of the consuming apparatus 302 (also referred to as host) with the consumable 301 only if the consumable 301 has successfully authenticated itself at the host authentication circuit 303 of the consuming apparatus 302 by means of said consumable's authentication chip 304.

Furthermore, the host authentication circuit 303 checks a processing parameter of the authentication chip 304 in order to ensure that the authentication chip 304 is not a counterfeit (e.g. not a clone).

The authentication chip 304 is configured in such a way that it adjusts this processing parameter depending on its power supply. The host authentication circuit 303 comprises a power supply 306 ("external" from the standpoint of the authentication chip 304) having a power source 307 (battery, power supply unit, etc.) and an internal resistance 308, which power supply feeds a (external) supply voltage VCC and a (external) supply current ICC to the authentication chip 304.

From this power fed to the authentication chip 304, a power management circuit 309 generates an internal power supply of the authentication chip 304 (e.g. for further components of the authentication chip 304, such as e.g. a cryptoprocessor, by means of which the authentication chip 304 responds to challenges of the host authentication circuit 303).

The authentication chip 304 is configured to compensate for fluctuations in its external supply by adjusting a processing parameter. In the example in FIG. 3, the authentication chip 304 is configured, if VCC falls below a specific threshold "Vmin", to control a clock generator 310 in such a way that the latter reduces the processing clock of the authentication chip 304 (this can also be done in a plurality of steps with a plurality of respective thresholds).

Figure 4:
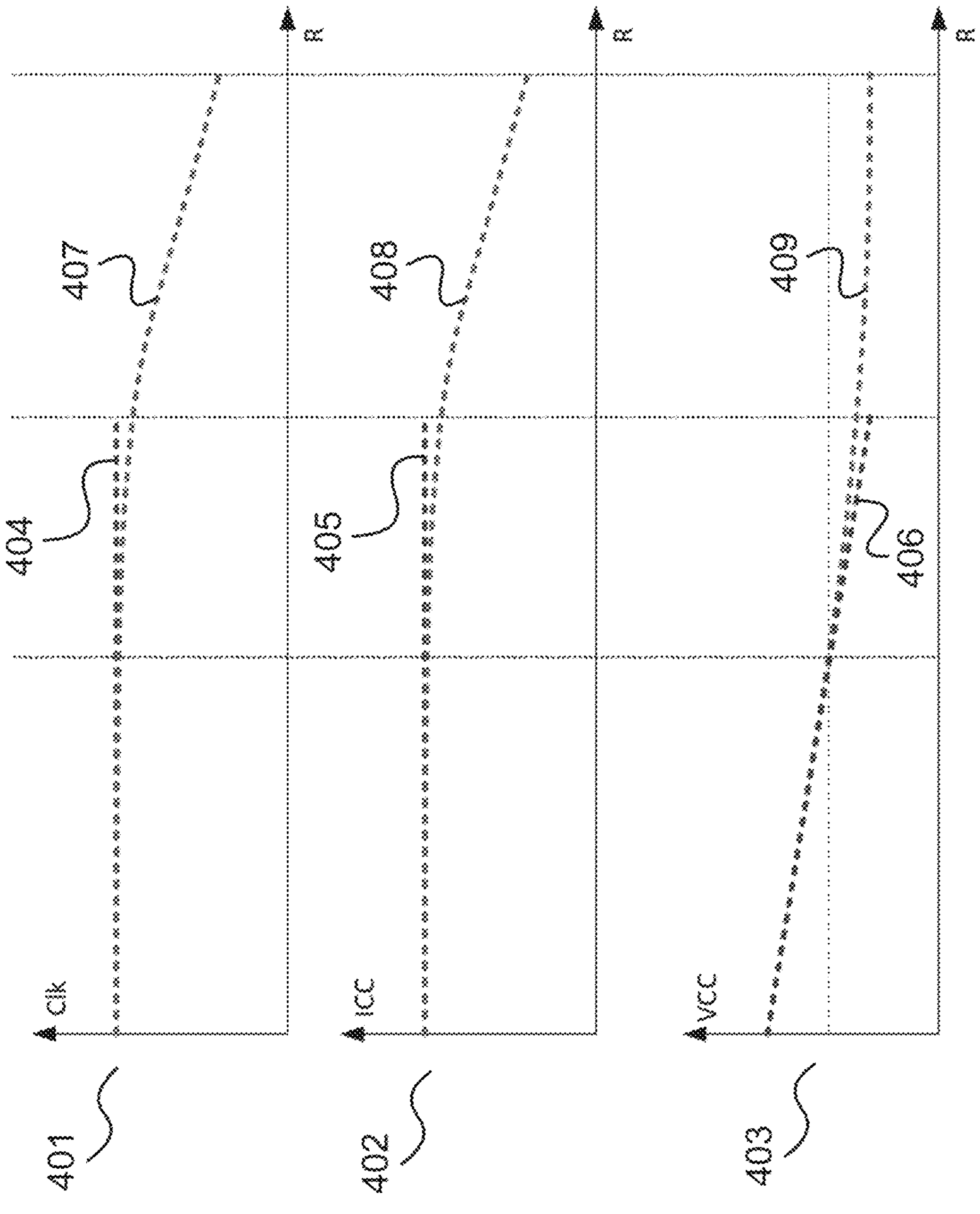
FIG. 4 shows one example of the dependence of the clock frequency of an authentication chip, of the current consumed thereby, and of its external supply voltage, on the internal resistance of its external power supply.

FIG. 4 shows one example of the dependence of the clock frequency of the authentication chip 304 (first diagram 401), ICC (second diagram 402) and VCC (third diagram 403) on the power supply internal resistance R.

In each of the three diagrams 401, 402, 403, a respective straight line 404, 405, 406 shows the profile of the clock frequency, ICC and VCC for an authentication chip which does not adapt the clock frequency in the case of a falling supply voltage VCC, and a respective curve 407, 408, 409 shows the profile of the clock frequency, ICC and VCC for an authentication chip which adapts the clock frequency in the case of a falling supply voltage VCC, as is assumed in the present exemplary embodiment for the authentication chip 304.

This behavior of the authentication chip 304 makes it possible to work at a higher internal resistance of the power supply 306 (up to a specific lower limit) (without a hard limitation taking effect, e.g. the authentication chip 304 being reset), by way of the processing speed of said chip being reduced. Said chip can thus support very low external supply voltages. The system frequency is therefore dynamically adapted in order to make it possible for the internal supply to remain in the required range despite the low external supply. In the vicinity of the lower limit, the deterioration in performance is accepted. This effect is relevant primarily to systems with weak current supply, in which the internal resistance 308 is quite high (e.g. 100 ohms). The decrease in the processing speed causes the current consumption ICC of the authentication chip 304 to drop, as a result of which in turn VCC is regulated to a specific level (see the end of the curve 409 for VCC). At a high internal resistance 308, therefore, the external supply voltage BCC is regulated for example to a level that is just above the level regarded as minimum supply (Vmin level). The system frequency and thus the current consumption are correspondingly regulated, the relationship between system frequency and current consumption depending on the activity in the authentication chip 304: If only the CPU is running, for example, it needs a certain value of μA/MHz. If additionally a cryptomodule is running (or a nonvolatile memory is being written to, etc.) this needs additional pA/MHz; for the same supply (that is to say the same current), therefore, only a lower clock frequency is possible.

The host authentication circuit 303 can then check whether the authentication chip 304 exhibits this behavior, in order to ensure that the latter is not a clone. A clone, in order not to be recognized as such by the host authentication circuit 303, ought to simulate this nonlinear behavior on the basis of a voltage/activity/temperature/process lookup table, e.g. by means of "manual" frequency scaling. Furthermore, it ought to be able to work at very low supply voltages.

In this respect, the host authentication circuit 303 increases the internal resistance 308 of the power supply 306 to a value at which this behavior ought to become visible (e.g. the clock frequency of the authentication chip 304 ought to drop), which the host authentication circuit 303 ought to be able to observe e.g. via its digital interface to the authentication chip 304 and checks whether the authentication chip 304 has this behavior. If the authentication chip does have this behavior, the host authentication circuit signals to the control device 305 (provided that it has also successfully authenticated the authentication chip 304 by way of the "customary" authentication as described with reference to FIG. 2) that the consuming apparatus 302 (consuming device) is permitted to use the consumable 301. If the authentication chip does not have this behavior, the host authentication circuit signals to the control device 305 that the consuming apparatus 302 (consuming device) is not permitted to use the consumable 301.

Figure 5:
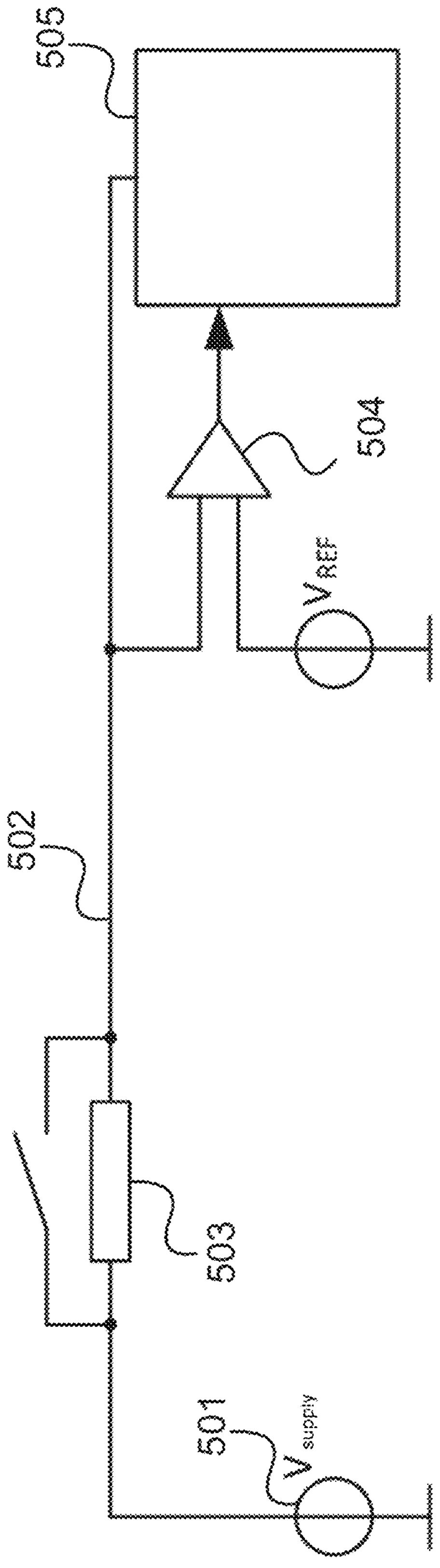
FIG. 5 shows a circuit arrangement that illustrates the adjusting of a processing parameter of the authentication chip depending on the internal resistance of the power supply.

FIG. 5 shows a circuit arrangement 500 that illustrates the adjusting of a processing parameter of the authentication chip 304 depending on the internal resistance 308 of the power supply 306.

A (ideal) voltage supply 501 corresponds to the power source 307. This is connected to the authentication chip 304 via a (electrically) conductive connection 502, into which the host authentication circuit 303 can insert a resistor 503. The host authentication circuit 303 can thus increase the internal resistance 308 of the power supply 306 by the value of the resistor 503. (In reality, the power source 307 is not ideal; its internal resistance may be ascribed to the connection 502.) The power management circuit 309 compares the voltage VCC supplied by the power supply 306 with a reference voltage $V_{REF}$ by means of a comparator 504 and controls the clock generator 505 (corresponding to the clock generator 310) depending on the comparison.

$V_{REF}$ or else "Vmin" is defined by the power management circuit 309. The host authentication circuit 303 can also comprise a plurality (or even a multiplicity) of connectable (or insertable) resistors 503 or a variable resistor 503, so that it can check the operating state of the authentication chip 304 for a plurality of operating points in order thus to determine a dependence of the operating state of the authentication chip on the internal resistance of the power supply (e.g. in other words detect one or more changes in the operating state of the authentication chip in reaction to one or more changes in the internal resistance). It can then compare this determined dependence with a reference dependence (or a reference behavior) (e.g. specified in a memory of the host authentication circuit 303) and, in the event of correspondence, authorize the use of the consumable 301 by the consuming device 302.

The reference behavior (e.g. the reference dependence of the operating state on (external) supply voltage fed in and thus on the internal resistance 308) can then be a complex dependence between operating state and internal resistance 308 and it is only if the authentication chip 304 exhibits a behavior which corresponds to this reference behavior that the host authentication circuit 303 authorizes the use of the respective consumable 301 by the consuming device (e.g. authorizes the operation of the consuming device 302 with the respective consumable 301).

The voltage $V_{supply}$ of the voltage supply 501 is chosen such that a significant voltage drop can occur at the internal resistance 308.

In accordance with various embodiments, the host authentication circuit 303 can thus observe or measure the clock frequency and use it as an analogous property of the authentication chip 304 in order to check that the latter is genuine (e.g. not a clone). The host authentication circuit can also determine the operating state of the authentication chip 304 (for various internal resistances 308) on the basis of the voltage drop (in particular at the internal resistance 308) or the current consumption.

The authentication chip 304 can also be configured such that a decrease in the supply of the authentication chip 304 (that is to say e.g. falling below $V_{REF}$ or Vmin) triggers for example a change in a different processing parameter (e.g. a different change in the operating state of the authentication chip 304), such as for example a change in the cryptographic functions used by the authentication chip 304 (e.g. DES instead of AES), which the authentication chip uses for replying to challenges of the host authentication circuit 303. In this regard, the host authentication circuit 303 can establish other changes in the behavior of the authentication chip 304 in addition or as an alternative to the current consumption/clock frequency. By way of a change in the internal resistance, the host authentication circuit 303 can probe this behavior (or the different operating states) and optionally also in the case of differing internal activity of the authentication chip 304.

Examples of the observation of operating states of the authentication chip 304 by the host authentication circuit 303 are

- measuring the internal supply voltage (e.g. via a corresponding pad of the authentication chip 304). It is thereby possible to check the regulation behavior with regard to the current consumption of the authentication chip 304.
- measuring the processing speed of the authentication chip 304. The processing speed depends primarily on the current consumption and is therefore dependent on the internal resistance 308.
- observing the functions used by the authentication chip 304 (optionally by way of the processing speed).
- measuring the current consumption ICC of the authentication chip 304 (depending on the internal resistance 308). The following relationship holds true:

$$ICC = (V_{supply} - VCC)/\text{internal resistance}$$

if other resistances of the connection of the power supply 306 to the authentication chip 304 are disregarded (or ascribed to the internal resistance).

Figure 6:
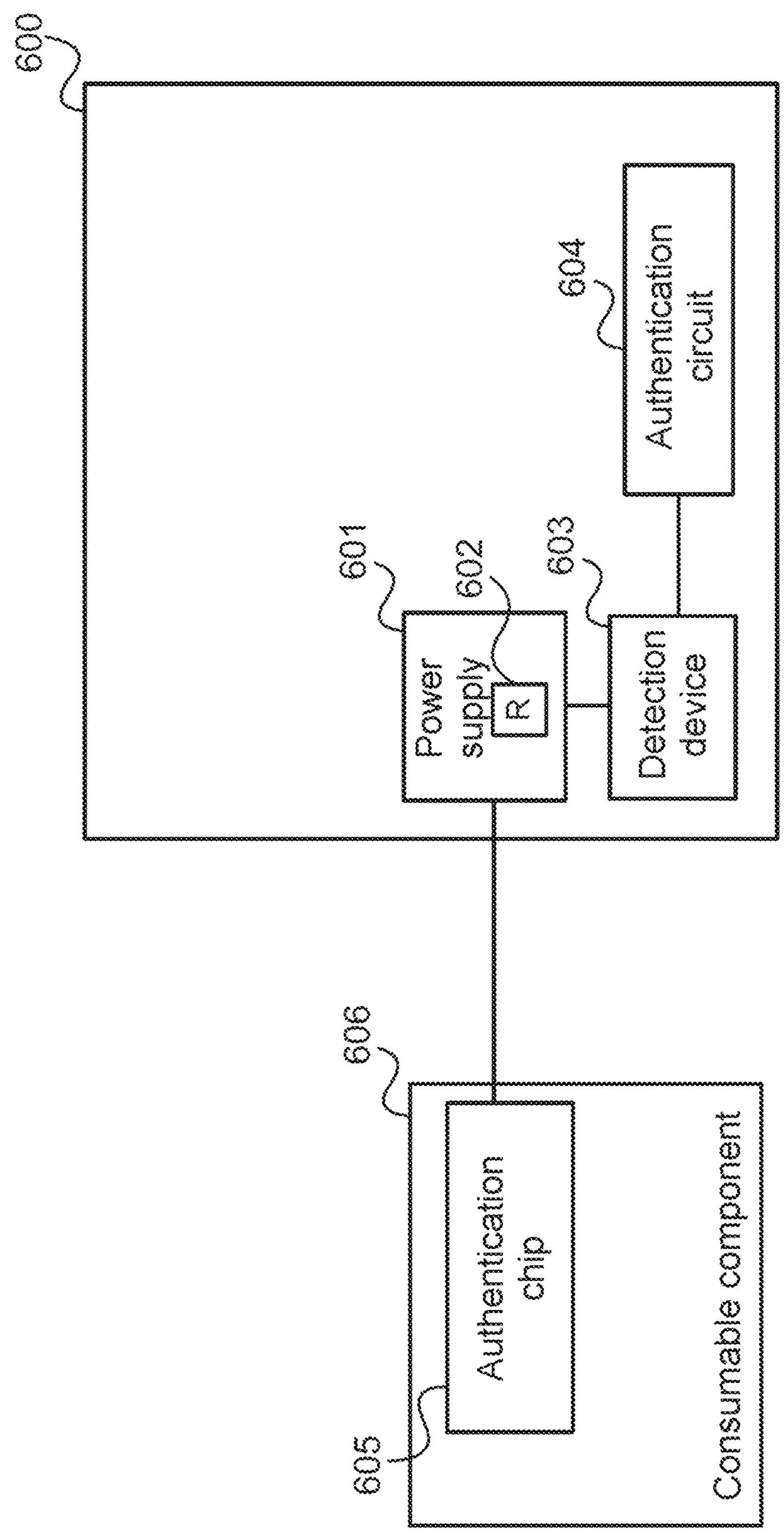
FIG. 6 shows a consuming device in accordance with one embodiment.

In summary, in accordance with various embodiments, provision is made of a consuming device as illustrated in FIG. 6.

FIG. 6 shows a consuming device 600 in accordance with one embodiment.

The consuming device 600 comprises a power supply 601 for an authentication chip 605 of a consumable component 606, the internal resistance 602 of which power supply is variable (e.g. by way of switching between different connection paths with different resistances).

The consuming device 600 furthermore comprises a detection device 603 configured

- to capture information about an operating state of the authentication chip 605 for a plurality of values of the internal resistance 602 of the power supply 601 and
- to determine a dependence of the operating state of the authentication chip 605 on the internal resistance 602 of the power supply 601 (e.g. to detect one or more changes in the operating state of the authentication chip 605 in reaction to one or more changes in the internal resistance 602).

The consuming device 600 furthermore comprises an authentication circuit 604 configured to authorize the use of the consumable component 606 by the consuming device 600 on the basis of the determined dependence.

In accordance with various embodiments, in other words, a consuming device checks the authenticity of a consumable component on the basis of the behavior of an authentication chip of the consumable component for different supplies (specifically different internal resistances of the power supply with which it supplies the consumable component). It is only if the authentication chip exhibits an expected behavior, e.g. reduces the operating clock frequency at higher internal resistance, that the use of the consumable component is authorized. Otherwise, the use thereof is blocked (inhibited).

The components of the consuming device, in particular the authentication circuit, can be realized by one or more circuits. In one embodiment, a "circuit" should be understood as any unit which implements a logic, and which can be hardware, software, firmware or else a combination thereof. Consequently, in one embodiment, a "circuit" can be a hardwired logic circuit or a programmable logic circuit, such as for example a programmable processor, e.g. a microprocessor. A "circuit" can also be understood to mean a processor which executes software, e.g. any kind of computer program, for instance a computer program in programming code for a virtual machine. In one embodiment, a "circuit" can be understood to mean any kind of implementation of the functions described herein.

In accordance with one embodiment, a method as illustrated in FIG. 7 is provided.

FIG. 7 shows a flowchart 700 that illustrates a method for authenticating a consumable component at a consuming device.

- 701 involves capturing information about an operating state of an authentication chip of the consumable component for a plurality of values of the internal resistance of a power supply used by the consuming device to supply the authentication chip.
- 702 involves determining a dependence of the operating state of the authentication chip on the internal resistance of the power supply.
- 703 involves authorizing the use of the consumable component by the consuming device depending on the determined dependence.

Various exemplary embodiments are specified below.

Exemplary embodiment 1 is a consuming device as described with reference to FIG. 6.

Exemplary embodiment 2 is a consuming device according to exemplary embodiment 1, wherein the detection device is configured to set the internal resistance of the power supply successively to the plurality of values, in each case to capture the information about the operating state and to determine the dependence of the operating state of the authentication chip on the internal resistance of the power supply from the captured information.

Exemplary embodiment 3 is a consuming device according to exemplary embodiment 1 or 2, wherein the operating state depends on an operating clock frequency of the authentication chip.

Exemplary embodiment 4 is a consuming device according to any of exemplary embodiments 1 to 3, wherein the detection device is configured to capture the information about the operation state by measuring the current consumption of the authentication chip, a processing speed of the authentication chip, a clock frequency of the authentication chip and/or an internal supply voltage of the authentication chip and/or on the basis of a processing function used by the authentication chip.

Exemplary embodiment 5 is a consuming device according to any of exemplary embodiments 1 to 4, wherein the authentication device is configured to authorize the consumable component by the consuming device under the prerequisite that the dependence of the operating state of the authentication chip on the internal resistance of the power supply corresponds to a predefined reference dependence.

Exemplary embodiment 6 is a consuming device according to exemplary embodiment 5, wherein the reference dependence is a reduction of the clock frequency, of the processing power, of the internal supply voltage and/or of the current consumption of the authentication chip in reaction to a decrease in the supply voltage fed thereto.

Exemplary embodiment 7 is a consuming device according to any of exemplary embodiments 1 to 6, wherein the authentication device is configured to authorize the consumable component by the consuming device under the prerequisite that the authentication chip supplies predefined reference authentication information in reaction to a request for authentication information.

Exemplary embodiment 8 is a consuming device according to any of exemplary embodiments 1 to 7, wherein the consuming device is a printer, a vaporizer, a battery-operated electrical apparatus or a vehicle.

Exemplary embodiment 9 is a system comprising a consuming device according to any of exemplary embodiments 1 to 8 and an authentication chip, wherein the authentication chip is configured to change its operating state depending on a supply voltage fed to it.

Exemplary embodiment 10 is a system according to exemplary embodiment 9, wherein the authentication chip is configured to reduce its clock frequency, processing power, internal supply voltage and/or its current consumption if the supply voltage fed to it falls below a predefined threshold value.

Exemplary embodiment 11 is a method for authenticating a consumable component at a consuming device as described with reference to FIG. 7.

Although the invention has been shown and described primarily with reference to specific embodiments, it should be understood by those familiar with the technical field that numerous modifications can be made thereto with regard to configuration and details, without departing from the essence and scope of the invention as defined by the claims hereinafter. The scope of the invention is therefore determined by the appended claims, and the intention is for all modifications to be encompassed which come under the literal meaning or the scope of equivalence of the claims.

What is claimed is:

1. A system, comprising:
- a consumable component including an authentication chip;
- a consuming device configured to receive the consumable component, the consuming device comprising:
  - a power supply having an internal resistance configured to vary between a plurality of resistance values, wherein the authentication chip is configured to change its operating state depending on a supply voltage from the power supply; and
  - a detection device configured to capture information about the operating state of the authentication chip for the plurality of resistance values of the internal resistance of the power supply, and further configured to determine a dependence of the operating state of the authentication chip on the plurality of resistance values; and
  - an authentication circuit configured to authorize use of the consumable component based on the determined dependence.

2. The system as claimed in claim 1, wherein the authentication circuit is configured to deny use of the consumable component in the consuming device when the operating state of the authentication chip deviates from a predetermined response when the internal resistance is varied between the plurality of resistance values.

3. The system as claimed in claim 1, wherein the authentication chip is configured to reduce its clock frequency, processing power, internal supply voltage and/or its current consumption when the supply voltage fed to the authentication chip falls below a predefined threshold value.

4. The system as claimed in claim 1, wherein the detection device is configured to set the internal resistance of the power supply successively to the plurality of resistance values, in each case to capture the information about the operating state and to determine the dependence of the operating state of the authentication chip on the internal resistance of the power supply from the captured information.

5. The system as claimed in claim 1, wherein the detection device is configured to capture the information about the operating state by measuring a current consumption of the authentication chip, a processing speed of the authentication chip, a clock frequency of the authentication chip, and/or an internal supply voltage of the authentication chip, and/or based on a processing function used by the authentication chip.

6. The system as claimed in claim 5, wherein the authentication circuit is configured to authorize use of the consumable component when the dependence of the operating state of the authentication chip on the internal resistance of the power supply corresponds to a predefined reference dependence.

7. The system as claimed in claim 6, wherein the predefined reference dependence is a reduction of the clock frequency, of the processing speed, of the internal supply voltage, and/or of the current consumption of the authentication chip in reaction to a decrease in the supply voltage fed thereto.

8. The system as claimed in claim 1, wherein the authentication circuit is configured to authorize use of the consumable component when the authentication chip supplies predefined reference authentication information in response to a request for authentication information.

9. The system as claimed in claim 1, wherein the consumable component is a printer cartridge, an e-cigarette cartridge, a vaporizer cartridge, or a refill or replacement component for a battery-operated electrical apparatus.

10. A consuming device, comprising:
- a power supply for an authentication chip of a consumable component, the power supply having a variable internal resistance;
- a detection device configured:
  - to capture information about an operating state of the authentication chip for a plurality of resistance values of the variable internal resistance of the power supply, and to determine a dependence of the operating state of the authentication chip on the plurality of resistance values of the power supply; and an authentication circuit configured to authorize use of the consumable component by the consuming device based on the determined dependence.

11. The consuming device as claimed in claim 10, wherein the detection device is configured to set the variable internal resistance of the power supply successively to the plurality of resistance values, in each case to capture the information about the operating state and to determine the dependence of the operating state of the authentication chip on the variable internal resistance of the power supply from the captured information.

12. The consuming device as claimed in claim 10, wherein the operating state depends on an operating clock frequency of the authentication chip.

13. The consuming device as claimed in claim 10, wherein the detection device is configured to capture the information about the operating state by measuring a current consumption of the authentication chip, a processing speed of the authentication chip, a clock frequency of the authentication chip, and/or an internal supply voltage of the authentication chip, and/or based on a processing function used by the authentication chip.

14. The consuming device as claimed in claim 13, wherein the authentication circuit is configured to authorize the consumable component by the consuming device when the dependence of the operating state of the authentication chip on the variable internal resistance of the power supply corresponds to a predefined reference dependence.

15. The consuming device as claimed in claim 14, wherein the predefined reference dependence is a reduction of the clock frequency, of the processing speed, of the internal supply voltage, and/or of the current consumption of the authentication chip in response to a decrease in the supply voltage fed thereto.

16. The consuming device as claimed in claim 10, wherein the authentication circuit is configured to authorize the consumable component by the consuming device when the authentication chip supplies predefined reference authentication information in reaction to a request for authentication information.

17. The consuming device as claimed in claim 10, wherein the consuming device is a printer, a vaporizer, a battery-operated electrical apparatus or a vehicle.

18. A system comprising: the consuming device as claimed in claim 10; and, wherein the authentication chip is configured to change its operating state depending on a supply voltage provided to the authentication chip.

19. The system as claimed in claim 18, wherein the authentication chip is configured to reduce its clock frequency, processing power, internal supply voltage and/or its current consumption if the supply voltage falls below a predefined threshold value.

20. A method for authenticating a consumable component at a consuming device, comprising:

capturing information about an operating state of an authentication chip of the consumable component for a plurality of values of a variable internal resistance of a power supply used by the consuming device to supply the authentication chip;

determining a dependence of the operating state of the authentication chip on the variable internal resistance of the power supply; and authorizing use of the consumable component by the consuming device depending on the determined dependence.

* * * * *